(12) United States Patent
Matusek et al.

(10) Patent No.: US 11,653,052 B2
(45) Date of Patent: May 16, 2023

(54) SYSTEMS AND METHODS FOR PRODUCING A PRIVACY-PROTECTED VIDEO CLIP

(71) Applicant: GENETEC INC., St-Laurent (CA)

(72) Inventors: Florian Matusek, Vienna (AT); Francis Lachance, Blainville (CA); Georg Zankl, Vienna (AT); Philippe Maynard, Laval (CA)

(*) Notice: Subject to any disclaimer, the term of this patent is extended or adjusted under 35 U.S.C. 154(b) by 175 days.

(21) Appl. No.: 17/080,651

(22) Filed: Oct. 26, 2020

(65) Prior Publication Data
US 2022/0132048 A1   Apr. 28, 2022

(51) Int. Cl.
| | |
|---|---|
| H04N 21/431 | (2011.01) |
| G06V 20/52 | (2022.01) |
| G06V 20/40 | (2022.01) |
| G06T 5/00 | (2006.01) |
| H04N 5/262 | (2006.01) |
| G11B 27/031 | (2006.01) |

(Continued)

(52) U.S. Cl.
CPC ......... H04N 21/4318 (2013.01); G06T 5/004 (2013.01); G06T 7/194 (2017.01); G06T 7/254 (2017.01); G06V 10/28 (2022.01); G06V 20/49 (2022.01); G06V 20/52 (2022.01); G11B 27/031 (2013.01); H04N 5/2621 (2013.01)

(58) Field of Classification Search
CPC .. H04N 21/4318; H04N 5/2621; G11B 27/28; G11B 27/031; G06V 20/52; G06V 20/49; G06V 10/28; G06T 7/194; G06T 7/254; G06T 5/004
See application file for complete search history.

(56) References Cited

U.S. PATENT DOCUMENTS

| | | | |
|---|---|---|---|
| 7,000,242 B1* | 2/2006 | Haber | G06Q 40/12 725/43 |
| 7,089,241 B1* | 8/2006 | Alspector | H04L 51/212 |

(Continued)

FOREIGN PATENT DOCUMENTS

| | | |
|---|---|---|
| CN | 110991361 A | 4/2020 |
| CN | 111260695 A | 6/2020 |

(Continued)

OTHER PUBLICATIONS

Martínez-Ponte et.al., "Robust Human Face Hiding Ensuring Privacy", Proceedings of the International Workshop on Image Analysis for Multimedia Interactive Services, 2005.

(Continued)

*Primary Examiner* — Michael B. Pierorazio

(57) ABSTRACT

Producing a privacy-protected video clip in a video management system includes retrieving a selected video clip constituting at least a portion of a stored video stream; obtaining segments of the video clip which are spaced apart in time and have a total length equal to a defined time period; combining the obtained segments of the video clip to form a background training clip; and processing the background training clip, or the separate segments, to produce a background model. The video clip is processed to produce a privacy-protected video clip, such that, for each image the video clip, the processing includes performing background subtraction, using the background model, to define foreground regions, and obscuring the defined foreground regions.

24 Claims, 4 Drawing Sheets

(51) Int. Cl.
*G06T 7/254* (2017.01)
*G06T 7/194* (2017.01)
*G06V 10/28* (2022.01)

(56) References Cited

U.S. PATENT DOCUMENTS

| | | | | |
|---|---|---|---|---|
| 8,095,597 B2* | 1/2012 | Rawat | .................. | H04L 51/212 709/206 |
| 8,234,561 B1* | 7/2012 | Bourdev | ................. | G06F 40/30 715/224 |
| 8,311,277 B2* | 11/2012 | Peleg | .................... | G06F 16/739 382/103 |
| 8,392,288 B1* | 3/2013 | Miller | .................... | G06Q 40/02 705/26.81 |
| 8,589,984 B1* | 11/2013 | Acharya | ............ | H04N 21/4722 725/60 |
| 9,058,523 B2* | 6/2015 | Merkel | ............ | G08B 13/19652 |
| 9,251,416 B2* | 2/2016 | Wu | .......................... | G06T 7/254 |
| 2002/0062482 A1* | 5/2002 | Bolle | .................... | H04N 19/20 375/E7.076 |
| 2002/0066050 A1* | 5/2002 | Lerman | ............... | G06F 11/1076 714/E11.034 |
| 2002/0069405 A1* | 6/2002 | Chapin | ................ | H04N 21/812 725/135 |
| 2005/0149910 A1* | 7/2005 | Prisament | ................ | G06F 8/51 717/115 |
| 2006/0173750 A1* | 8/2006 | Naley | .................. | G06Q 10/087 705/26.81 |
| 2006/0190481 A1* | 8/2006 | Alspector | ............. | H04L 51/212 |
| 2006/0282332 A1* | 12/2006 | Pfleging | ................ | G06Q 20/209 705/24 |
| 2006/0291695 A1* | 12/2006 | Lipton | ................... | G06V 20/52 382/103 |
| 2007/0127774 A1* | 6/2007 | Zhang | ............. | G08B 13/19602 382/103 |
| 2007/0162258 A1* | 7/2007 | Lin | ........................ | G06Q 10/06 702/182 |
| 2008/0143689 A1* | 6/2008 | Foo | ....................... | G06F 3/0443 345/173 |
| 2008/0295129 A1* | 11/2008 | Laut | ..................... | H04N 21/812 725/34 |
| 2008/0298645 A1* | 12/2008 | Doi | ......................... | G06F 21/32 382/118 |
| 2009/0060278 A1* | 3/2009 | Hassan-Shafique | ... | G06V 20/52 382/103 |
| 2009/0220149 A1* | 9/2009 | Menadeva | ............. | G06V 10/46 382/199 |
| 2009/0228920 A1* | 9/2009 | Tom | ....................... | H04N 7/163 725/35 |
| 2010/0131385 A1* | 5/2010 | Harrang | ............. | G06Q 30/0631 705/26.1 |
| 2010/0183227 A1* | 7/2010 | Park | ..................... | G06V 40/103 382/195 |
| 2010/0278453 A1* | 11/2010 | King | ..................... | G06F 40/197 715/230 |
| 2011/0137753 A1* | 6/2011 | Moehrle | .......... | H04N 21/47815 725/60 |
| 2011/0138326 A1* | 6/2011 | Roberts | ............... | G06Q 30/0243 715/808 |
| 2011/0157067 A1* | 6/2011 | Wagner | ............... | G06F 3/04166 345/174 |
| 2011/0283189 A1* | 11/2011 | McCarty | ............ | H04N 21/4532 715/810 |
| 2011/0295988 A1* | 12/2011 | Le Jouan | ................ | G06F 21/31 709/223 |
| 2012/0079049 A1* | 3/2012 | Rawat | .................. | H04L 51/212 709/206 |
| 2012/0084811 A1* | 4/2012 | Thompson | ........... | H04N 21/812 725/34 |
| 2013/0086465 A1* | 4/2013 | Boudville | .......... | G06Q 20/3276 235/375 |
| 2018/0144476 A1* | 5/2018 | Smith | .................. | G06V 10/761 |
| 2020/0077035 A1* | 3/2020 | Yao | ......................... | G06V 20/52 |
| 2020/0145590 A1* | 5/2020 | Elboher | ................ | G06V 20/54 |
| 2020/0211348 A1* | 7/2020 | Wang | .................. | G06V 40/161 |

FOREIGN PATENT DOCUMENTS

| | | |
|---|---|---|
| EP | 3723049 A1 | 10/2020 |
| WO | 2011/014901 A2 | 2/2011 |

OTHER PUBLICATIONS

Rav-Acha, Alex, Yael Pritch, and Shmuel Peleg. "Making a long video short: Dynamic video synopsis." 2006 IEEE Computer Society Conference on Computer Vision and Pattern Recognition (CVPR'06). vol. 1. IEEE, 2006.

Barnich, Olivier, and Marc Van Droogenbroeck. "ViBe: a powerful random technique to estimate the background in video sequences." 2009 IEEE international conference on acoustics, speech and signal processing. IEEE, 2009.

Cohen, Scott. "Background estimation as a labeling problem." Tenth IEEE International Conference on Computer Vision (ICCV'05) vol. 1. vol. 2. IEEE, 2005.

Corresponding European application No. 21201874.1 extended European search report dated Mar. 22, 2022.

C. Stauffer et al., Adaptive background mixture models for real-time tracking.Proceedings. Proceedings of the 1999 IEEE Computer Society Conference on Computer Vision and Pattern Recognition (Cat. No. PR00149), Jun. 23-25, 1999; Fort Collins, Colorado, Jan. 1, 1999, pp. 246-252.

* cited by examiner

SYSTEMS AND METHODS FOR PRODUCING A PRIVACY-PROTECTED VIDEO CLIP

BACKGROUND

Technical Field

The present disclosure generally relates to producing a privacy-protected video clip.

Description of the Related Art

The use of video cameras to monitor both private and public areas for security purposes is widespread. Video surveillance systems produce recorded video in which individuals are clearly identifiable. The video data produced by such systems can be repeatedly reviewed and copied by security personnel and easily distributed. In general, the public has no knowledge of, or control over, the handling and use of the vast quantities of video data produced by such systems. All of this raises privacy concerns and leads to opposition to the use of video surveillance, even though such systems can be instrumental in combatting crime and terrorism. This has led to the adoption of techniques for modifying surveillance video to protect the privacy of individuals.

In conventional solutions for protecting the privacy of individuals in surveillance videos, "object detectors" are used to detect sensitive image areas, such as a face, person, or car. These sensitive areas are then obscured, for example, by pixelizing the sensitive areas. However, object detectors lack reliability in determining what and/or when particular objects should be pixelized, making them ill-suited for many privacy protection scenarios. Object detectors are discussed in Martinez-Ponte et. al., "Robust Human Face Hiding Ensuring Privacy", Proceedings of the International Workshop on Image Analysis for Multimedia Interactive Services, 2005 and also in U.S. Patent Application Publication No. 20100183227 A1.

Other conventional solutions for protecting privacy in surveillance videos require manual intervention to select an object or element of the video to be redacted. Such approaches increase the labor, and cost, required for a video to be sufficiently protected, especially when there is a high volume of video data to be redacted.

In other solutions, a model may be built of the background in the camera view over time to detect any areas that are unusual or moving and the detected areas are then obscured, as discussed in WO 2011014901A2. However, solutions based on building a background model require processing time to reliably distinguish background from foreground. Typically, this additional required time leads to solutions in which the obscuring process is applied to the video streams as they are received and the obscured version of the video streams are stored for later retrieval. To do so, such processes must learn and improve the background of the scene continuously. This consumes significant computing resources and is a requirement which grows with the number of cameras used in the system.

BRIEF SUMMARY

Disclosed embodiments provide for privacy protecting a video clip to be exported, while using only the video clip itself for learning a background model to be used to obscure private areas in the video clip. Disclosed embodiments provide a solution in which video clips are obscured on demand when they are being exported and no manual intervention is required in the processing of the video data.

A method of producing a privacy-protected video clip in a video management system comprising one or more processors and memory. The method may be summarized as including: obtaining, using the one or more processors, a plurality of segments of a video clip corresponding to at least a portion of a video stream stored in storage accessible by the system. The plurality of segments are spaced apart in time in the video clip and have a total length equal to a defined time period. The method further includes processing the plurality of segments to produce a background model. The method further includes processing the video clip to produce a privacy-protected video clip, wherein, for each image of a plurality of images of the video clip, the processing includes: performing background subtraction, using the background model, to define foreground regions, and obscuring the defined foreground regions. The method further includes outputting the privacy-protected video clip.

Embodiments may include one or more of the following features.

The method may further include combining the plurality of segments of the video clip to form a background training clip, wherein processing the plurality of segments to produce the background model includes processing the background training clip to produce the background model. The obtaining of the plurality of segments of the video clip may include extracting the plurality of segments from the portion of the video stream stored in the storage. The method may further include retrieving the video clip into the memory of the system, wherein the obtaining of the plurality of segments of the video clip includes extracting the plurality of segments from the video clip retrieved into the memory. Prior to the obtaining of the plurality of segments of the video clip corresponding to the portion of the video stream stored in storage accessible by the system, the method may further include: receiving the video stream from one or more cameras of a surveillance system; and storing the video stream in the storage accessible by the system. The processing of the video clip to produce the privacy-protected video clip may include obtaining each image of the plurality of images of the video clip from the portion of the video stream stored in the storage.

The defined time period may be greater than or equal to a learning time to produce the background model. A segment length may be defined and each of the obtained plurality of segments of the video clip may have a length which is approximately equal the defined segment length. The obtained plurality of segments of the video clip may be approximately equally spaced apart in time in the video clip. The obtained plurality of segments of the video clip may extend across at least a majority of the video clip.

The method may further include receiving a selection by a user of one or more time periods of the obtained plurality of segments of the video clip. In the processing of the plurality of segments to produce the background model, the processing may be performed without information from any previously retrieved video clips of the video stream. The performing of the background subtraction on the video clip using the background model to define foreground regions may include comparing a current image of the video clip to the background model to produce a foreground mask. The processing of the video clip to produce a privacy-protected video clip may include pixelizing the defined foreground regions. After outputting the privacy-protected video clip, the method may further include deleting the privacy-protected video clip from the memory of the system without storing the privacy-protected video clip in the storage accessible by the system.

A system to produce a privacy-protected video clip may be summarized as including one or more processors, memory, and storage. The memory stores a set of instructions that, as a result of execution by the one or more processors, cause the one or more processors to perform methods described herein.

A non-transitory computer-readable storage medium may be summarized as having computer-executable instructions stored thereon that, when executed, cause at least one computer processor to perform methods described herein.

DETAILED DESCRIPTION

In the following description, certain specific details are set forth to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Reference throughout this specification to "one implementation," "an implementation," or "implementations" means that a particular feature, structure or characteristic described in connection with the implementation(s) is included in at least one implementation. Thus, appearances of the phrases "in one implementation," "in an implementation," or "in implementations" in the specification are not necessarily all referring to the same implementation(s). Furthermore, the particular features, structures, or characteristics may be combined in any suitable manner in one or more implementations. As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

Figure 1:
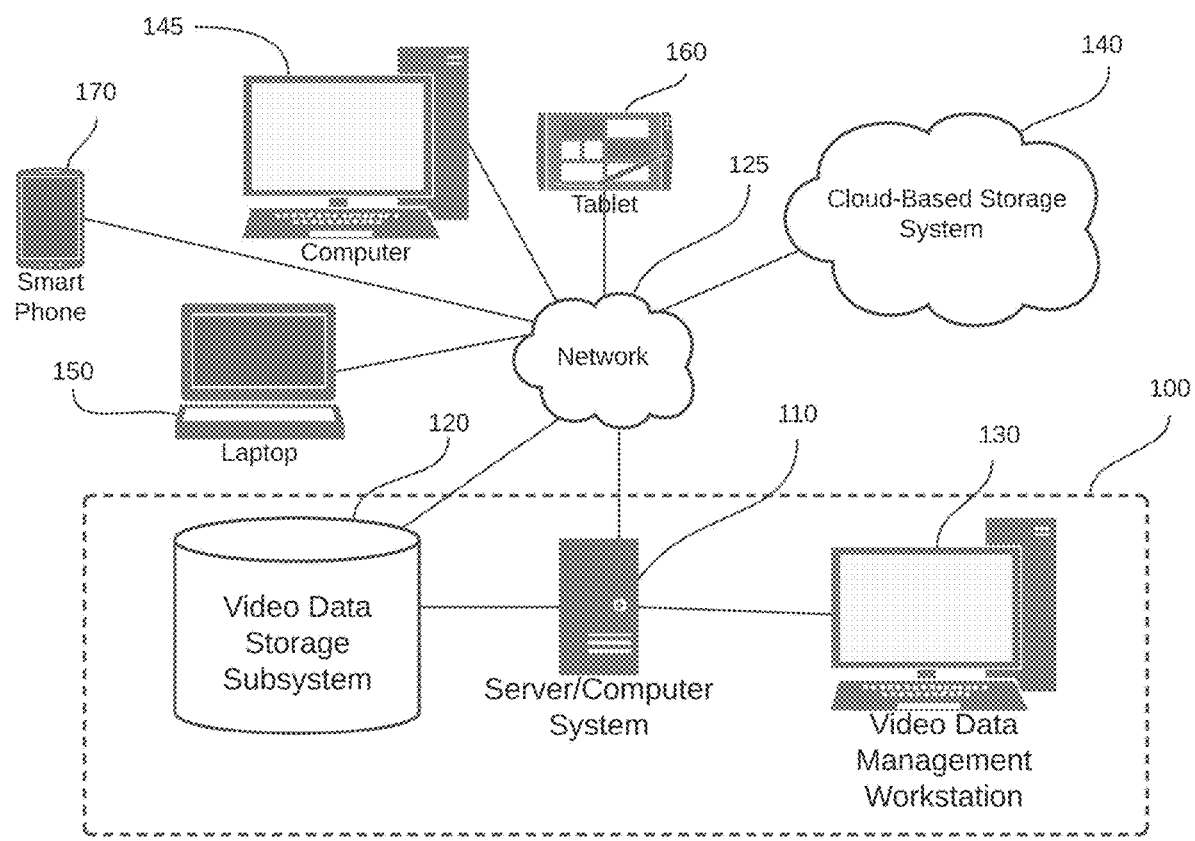
FIG. 1 is a block diagram of a video data management system to produce privacy-protected video clips, according to one illustrated embodiment.

FIG. 1 is a block diagram of a video data storage management system 100 to produce privacy-protected video clips. In implementations, the system 100 includes a server/computer system 110 (referred to herein as "server") which executes computer program instructions to carry out methods described herein. The server 110 interacts with a video data storage subsystem 120 which stores data, such as video stream data received from surveillance video cameras. The server 110 and the storage subsystem 120 may be connected directly or via a network, e.g., a local network (not shown) or a public network 125, e.g., the Internet. In implementations, the server 110 may store at least a portion of the video data in a remote storage system, such as a cloud-based storage system 140 accessed via the network 125 or a private network. In implementations, the server 110 may may be a cloud-based computing infrastructure. The methods described herein may be implemented by one or more virtual processors of the cloud-based computing infrastructure. In implementations, the server 110 may comprise the storage subsystem 120. Regardless of whether the server 110 comprises the storage subsystem 120 or the storage subsystem 120 is external of the server 110, the storage subsystem 120 is accessible by the server 110. The storage subsystem 120 may be referred to as "storage". While the storage subsystem 120 is illustrated as being part of the system 100, in implementations, the storage subsystem 120 may be external to the system 100.

The server 110 also interacts with a video data management workstation 130, which provides a user interface for interacting with and controlling the video data storage management system 100. The video data management workstation 130 allows a user to, inter alia, store, retrieve, view, manipulate, and distribute video data, e.g., video stream data, stored in the storage subsystem 120. The video data management workstation 130 may also allow users to manage and control the distribution of video data retrieved from the storage subsystem 120 with remote users via the network 125, such as users connected via personal and mobile devices, e.g., computers 145, laptops 150, and tablets 160, as well as smartphones 170. As discussed in further detail below, the video data management workstation 130 may have its own processor or processors and memory and may independently run software for performing methods described herein. Alternatively, the video data management workstation 130 may function largely as a client, e.g., using a web browser or client application, while relying, for the most part, on the server 110 to perform methods described herein. In implementations, the server 110 may provide a user interface for interacting with and controlling the video data storage management system 100, in which case a separate video data management workstation 130 is not necessary. While the workstation 130 is illustrated as being part of the system 100, in implementations, the workstation 130 may be external to the system 100.

Figure 2:
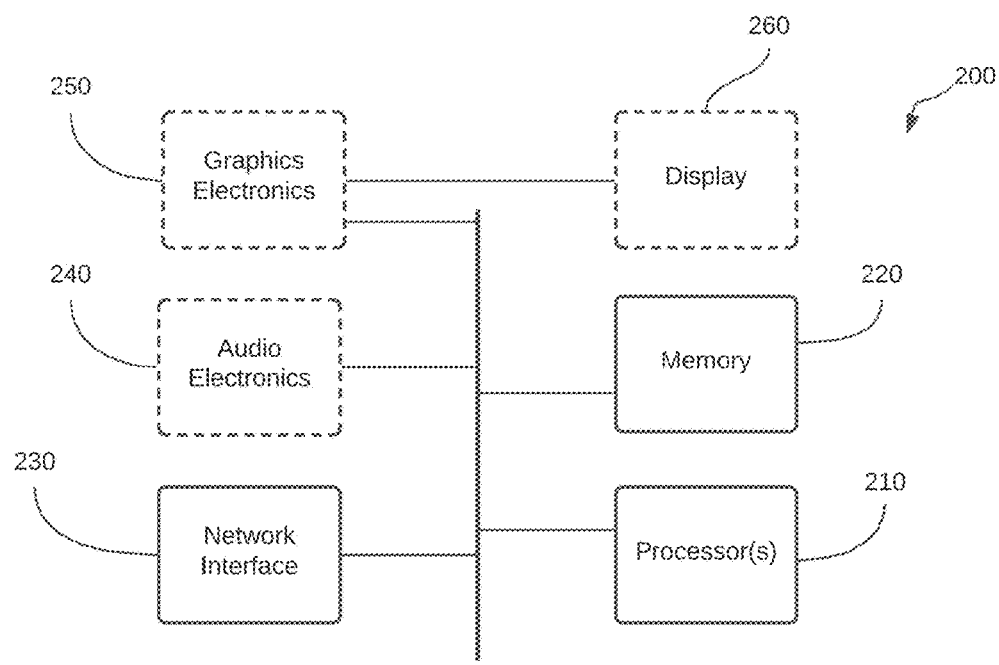
FIG. 2 is a block diagram of the server configured to interact with the video data storage subsystem to produce privacy-protected video clips.

FIG. 2 is a block diagram of the server 110 configured to interact with the video data storage subsystem 120 to produce privacy-protected video clips. The server 110 may be implemented as a computing platform 200 having one or more processors 210, memory 220, e.g., random access memory (RAM), to store data and program instructions to be executed by the one or more processors 210. The computing platform 200 also includes a network interface 230, which may be implemented as a hardware and/or software-based component, such as a network interface controller or card (NIC), a local area network (LAN) adapter, or a physical network interface, etc. In implementations in which the server 110 provides a user interface for interacting with and controlling the video data storage management system 100, the computing platform 200 may also include audio electronics 240 to output audio to a user, graphics electronics 250 to render video data, e.g., a video graphics card and/or processor, and a display 260 to display the user interface and rendered video to the user.

Figure 3:
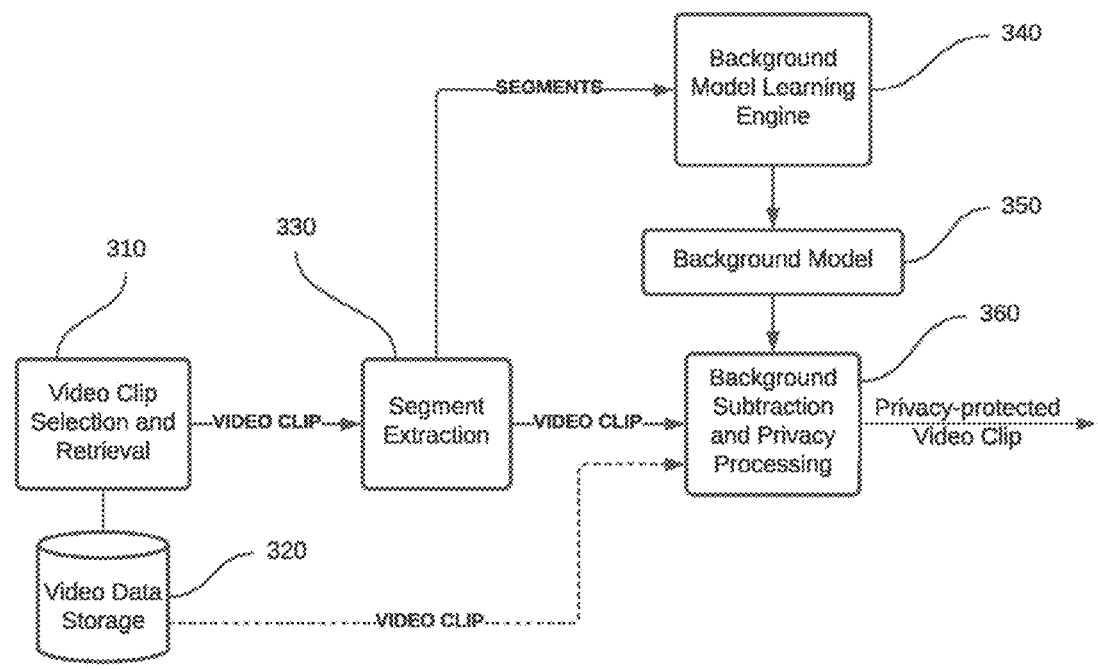
FIG. 3 is a diagram depicting producing a privacy-protected video clip in a video management system.

FIG. 3 is a diagram depicting producing a privacy-protected video clip in a video management system 100 (see FIG. 1). As depicted in the figure, there is a video clip selection and (optionally) a retrieval 310 in which a user accesses stored data for a video stream comprising a plurality of images, e.g., from a surveillance video camera, to select a video clip, i.e., a specific time period of the video stream or the entire stored video stream. This may be done using the video data management workstation 130 (see FIG. 1). The selected video clip is retrieved from video data storage 320 (e.g., video data storage subsystem 120) into the memory of the system 100. Alternatively, the selected video clip may be accessed in the storage 320 on an as-needed basis during the processing described herein.

In implementations, the video stream is received from one or more cameras of a surveillance system and stored in the storage of the system. Thus, in such a case, the methods described herein are applied to stored data rather than in "real time," i.e., rather than as the data is received from the source. This is advantageous in that the methods described herein need only be applied to a particular video clip as it is retrieved, as opposed to being applied continuously to all of the video stream data as it is received, which would require significant processing resources.

The retrieved video clip undergoes segment extraction 330, in which a number of segments are defined within the video clip. The segments may be combined to form a background training clip, which is input to a background model learning engine 340, or the segments may be input to the background model learning engine 340 separately.

The background model learning engine 340 uses an algorithm to produce a background model 350 based on the composite segment clip (or the separate segments). The algorithm may include the use of an unsupervised machine-learning technique in combination with any of a number of features extracted from the images of the segments, such as color. Various methods and algorithms may be used to produce the background model 350, such as, for example, a Gaussian mixture model, support vector machines, and neural networks.

In some embodiments, the algorithm is based on the use of a sparse histogram per pixel and color channel as a background model 350. In this approach, the bin location and values of the histogram are updated based on values from the input image. If a value from the input image is close to a bin, the corresponding bin value increases. Bin values continuously decrease and may be replaced with the values from the input image when they fall below a defined value. The determination of where to obscure the input image is done per block, based on a calculated per-pixel difference compared to the model. A determination is made as to how many pixels per block are in a defined range indicating a high degree of difference compared to the model. If the number of pixels per block in the defined high difference range is greater than a defined threshold, then the block is obscured.

In implementations, the processing of the background training clip (or separate segments) to produce the background model 350 does not use information from any previously retrieved video clips. In other words, the background model is generated "from scratch" for each retrieved video clip, i.e., without prior learning being used in the algorithm. This is advantageous in that the system can rely solely on the retrieved video clip to produce the background model 350, which means that the methods can be carried out even if the remaining video stream data is not available. Alternatively, a machine learning model which has been trained on unrelated data could be used. In such a case, the model has been trained in advance but, as above, the training does not rely on previously-retrieved video clips, i.e., previous video clips taken from the stored video stream data associated with the retrieved video clip.

The background model 350 acts, in effect, as a mask to separate foreground objects, i.e., objects which in motion and/or changing over time, from the static background of the image. It is used by the background subtraction and privacy processing 360, in which the retrieved video clip is processed to produce a privacy-protected video clip. As noted above, the selected video clip may be accessed in the storage 320 on an as-needed basis, rather than being retrieved into memory during the video clip selection and retrieval 310. In such a case, the background processing 360 is performed on the portion of the stored video stream which corresponds to the selected video clip (as represented by dashed line between 320 and 360).

The video clip comprises a plurality of images. For each image of the plurality of images of the video clip, the background subtraction and privacy processing 360 includes performing background subtraction, using the background model 350, to define foreground regions. Specifically, a current image of the video clip is compared to the background model 350 to produce a foreground mask which specifies the areas of pixels deemed to be in the foreground regions. The identified foreground regions are obscured, e.g., by pixelizing the defined foreground regions, which involves assigning an average color value to image blocks. Various other processes can be used for obscuring foreground regions, such as colorizing (i.e., assigning a defined color to image blocks), blurring, and inverting (i.e., inverting color values of image blocks). The resulting output is the privacy-protected video clip.

In implementations, after outputting the privacy-protected video clip, the privacy-protected video clip is deleted from the memory of the system without storing it in the storage of the system. This is advantageous in that only the original, unprotected video stream data is stored, thereby reducing storage resources. Each privacy-protected video clip is generated as it is retrieved (i.e., "on-the-fly") and kept only as long as needed to output, e.g., export, the video clip.

Figure 4:
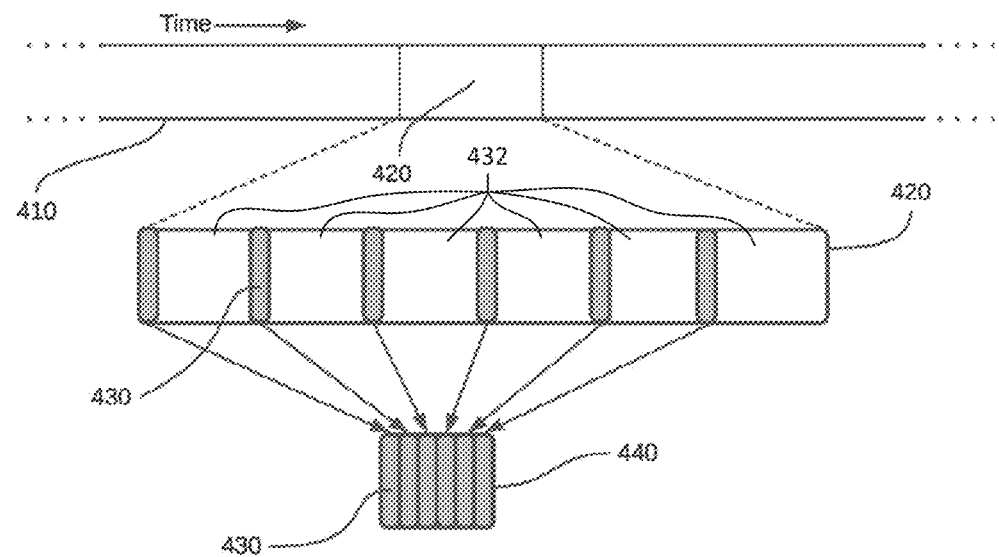
FIG. 4 is a diagram depicting retrieval of a video clip from a video stream and extraction of segments of the video clip to produce a background training clip.

FIG. 4 is a diagram depicting retrieval of a video clip from a video stream and extraction of segments of the video clip to produce a background training clip. As discussed above with respect to FIG. 3, a user may access data for a stored video stream 410 to select a particular video clip 420. The retrieved video clip undergoes segment extraction, in which a number of segments 430 are defined within the video clip 420. The segments 430 are spaced apart in time, e.g., equally spaced, within the video clip 420, thus omitting a remainder 432 of the video clip 420, portions of which separate the segments 430. The segments 430 may be unevenly spaced within the video clip 420. For example, the segments 430 may be randomly distributed throughout the video clip 420. In implementations, the extracted plurality of segments of the video clip may extend across at least a majority of the video clip. In implementations, the system may allow for a selection by the user of one or more time periods of the extracted plurality of segments of the video clip. For example, the user could select specific time periods for each of the segments or outer bounds within which the segments are defined. This is advantageous in that it allows a user to manually select positions for the segments in which foreground objects, e.g., people, are not present. The segments 430 have a total, i.e., combined, length equal to a defined time period, which is determined based at least in part on the characteristics of the algorithm used by background model learning engine 340 (see FIG. 3) to produce the background model 350. In implementations, the defined time period may be greater than or equal to a learning time to produce the background model, e.g., the learning time of a machine learning algorithm. In implementations, the defined time period may be equal to or greater than a specified fraction of the video clip.

By virtue of this arrangement, a more accurate background model can be obtained without a significant increase in processing resources because the learning time is, in effect, spread over a wider span of the video clip, thereby reducing the effect of transient background conditions. For example, if a person or vehicle in a surveillance video were to remain still in the first minute of a video clip, then a learning period concentrated in the first minute of the video clip would consider the person or vehicle to be part of the background and, consequently, the identity of the person or vehicle would not be protected.

In implementations, there may be a defined segment length, i.e., segment time duration, such that each of the segments 430 has a length approximately equal to the defined segment length. The segments 430 may have the same or different segment lengths. The defined segment length multiplied by the number of segments equals the defined time period. The segment length may be determined by considering the effect of the segment length on processing speed and other performance-related considerations.

In implementations, the segments 430 may be spaced throughout the video clip or, alternatively, positioned at intervals only in a portion of the video clip, e.g., positioned at intervals throughout a beginning portion of the video clip. As an example, the video clip may be 6 minutes in length and may have 6 segments, each of which is 10 seconds in length, and which are positioned at intervals of 1 minute. By way of another example, if the video clip 420 is longer than a certain period of time (e.g, 10 minutes), then then segments 430 may be distributed over an initial period of time (e.g., 10 minutes) of the video clip 420.

As discussed above with respect to FIG. 3, the segments 430 may be combined to form a composite segment clip 440, which is used as a background training clip to produce the background model.

Figure 5:
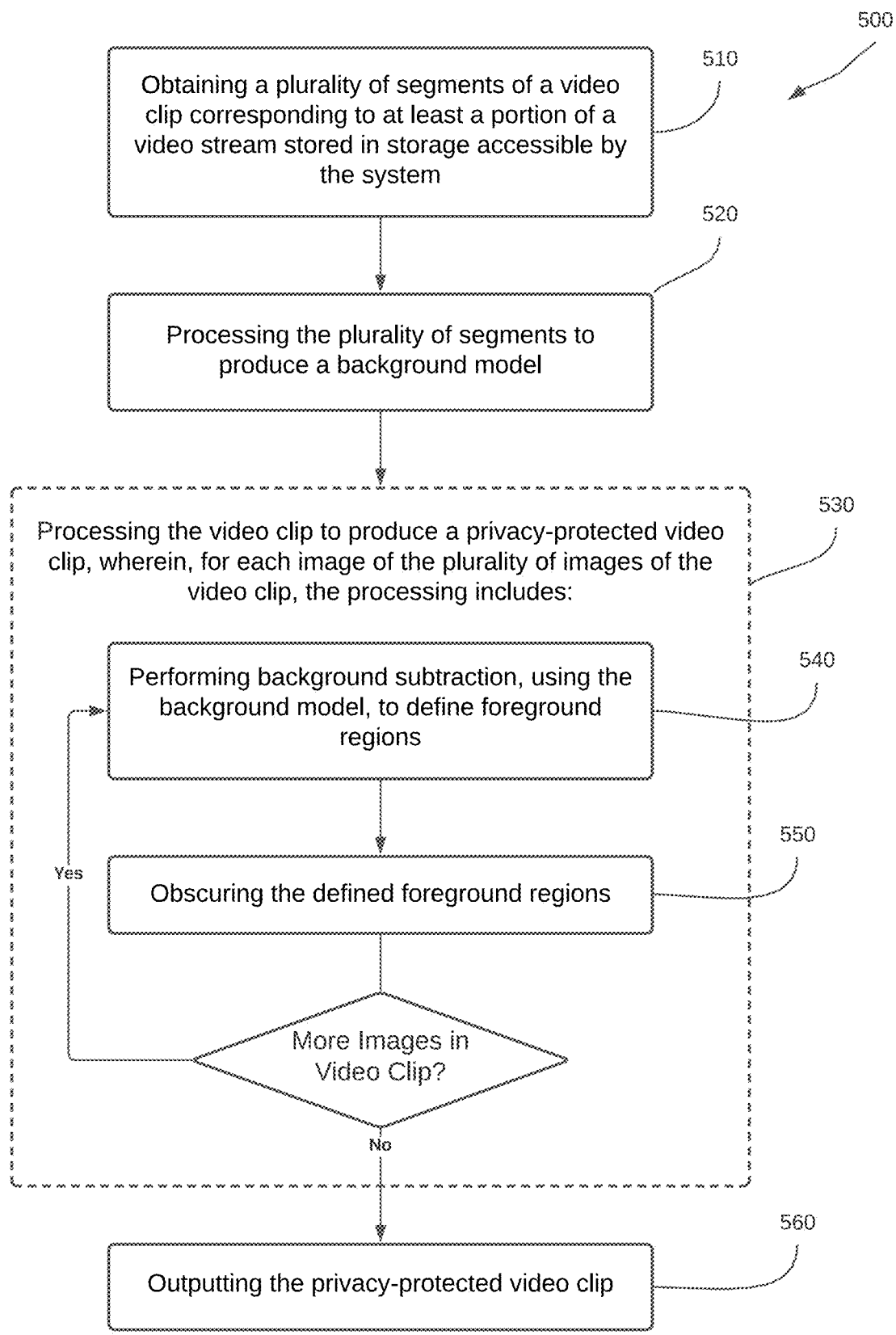
FIG. 5 is a flow chart of a method of producing a privacy-protected video clip using a video management system.

FIG. 5 is a flow chart of a method 500 of producing a privacy-protected video clip. The method 500 may be implemented by a system comprising one or more processors and memory. The method 500 may be implemented by a video management system, such as the video management system 100. The method 500 may be implemented by one or more virtual processors of a cloud-based computing infrastructure. The method includes obtaining a plurality of segments of a video clip corresponding to at least a portion of a video stream stored in storage accessible by the system (510). The plurality of segments are spaced apart in time in the video clip and having a total length equal to a defined time period. The method further includes processing the plurality of segments to produce a background model (520). The method further includes processing the video clip to produce a privacy-protected video clip (530). For each image of a plurality of images of the video clip, the processing (530) includes performing background subtraction, using the background model, to define foreground regions (540), and obscuring the defined foreground regions (550). The resulting privacy-protected video clip is output (560).

The method 500 may include one or more of the following aspects which are not shown in the figure. For example, the method 500 may further include combining the plurality of segments of the video clip to form a background training clip, in which case the processing the plurality of segments to produce the background model (520) includes processing the background training clip to produce the background model. The obtaining of the plurality of segments of the video clip (510) may include extracting the plurality of segments from the portion of the video stream stored in the storage. Alternatively, the method 500 may further include retrieving the video clip into the memory of the system, in which case the obtaining of the plurality of segments of the video clip (510) includes extracting the plurality of segments from the video clip retrieved into the memory. In some cases, prior to the obtaining of the plurality of segments of the video clip (510), the method 500 may further include receiving the video stream from one or more cameras of a surveillance system and storing the video stream in the storage accessible by the system. In implementations in which the video clip is not initially retrieved into the memory of the system, the processing of the video clip to produce the privacy-protected video clip (530) may include obtaining each image of the plurality of images of the video clip from the portion of the video stream stored in the storage.

The method 500 may further include receiving a selection by a user of one or more time periods of the extracted plurality of segments of the video clip. In the processing of the plurality of segments to produce the background model (520), the processing may be performed without information from any previously retrieved video clips of the video stream. The performing of the background subtraction on the video clip using the background model to define foreground regions (540) may include comparing a current image of the video clip to the background model to produce a foreground mask. The processing of the video clip to produce a privacy-protected video clip (530) may include pixelizing the defined foreground regions. After the outputting of the privacy-protected video clip (560), the method 500 may further include deleting the privacy-protected video clip from the memory of the system without storing the privacy-protected video clip in the storage accessible by the system.

The execution of the method 500 may involve one or more of the following features. As noted above, the plurality of segments which are obtained as described above (510) are spaced apart in time in the video clip and having a total length equal to a defined time period. The defined time period may be greater than or equal to a learning time to produce the background model. Furthermore, a segment length may be defined and each of the extracted plurality of segments of the video clip may have a length which is approximately equal the defined segment length. The extracted plurality of segments of the video clip may be approximately equally spaced apart in time in the video clip and, in some cases, the extracted plurality of segments of the video clip may extend across at least a majority of the length of the video clip.

Figure 6:
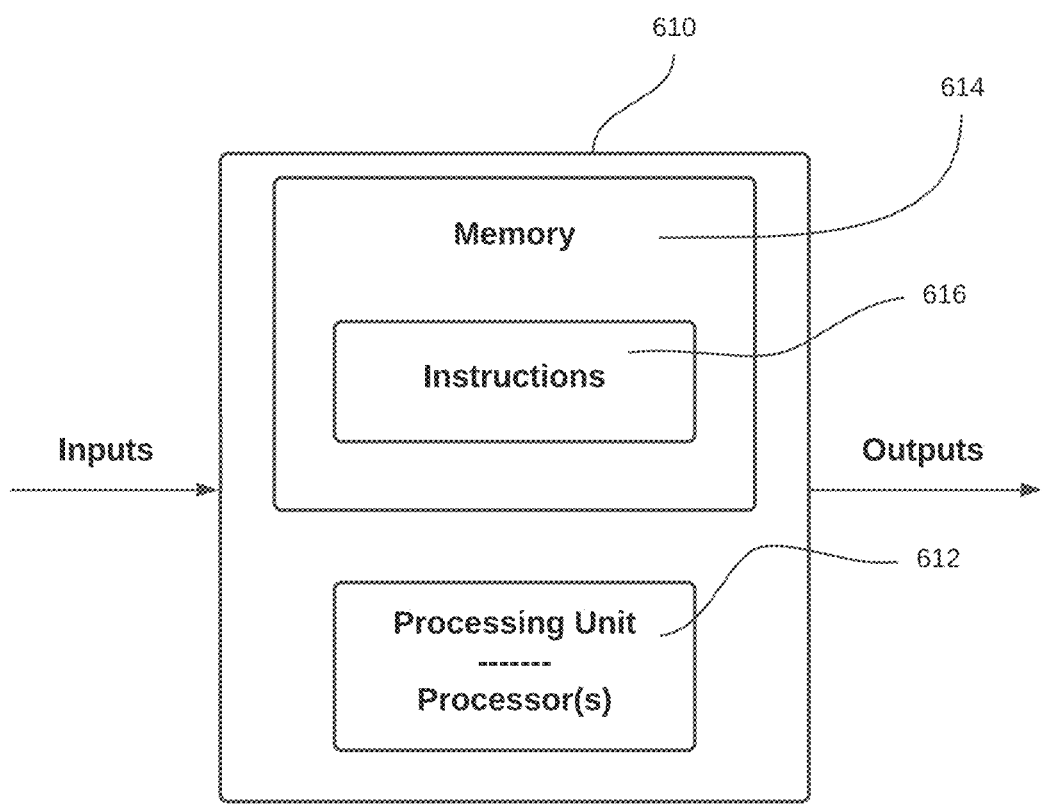
FIG. 6 is a block diagram of an example of a computing device usable to implement the methods described herein.

FIG. 6 is a block diagram of an example of a computing device usable to implement the methods described herein. The method(s) described herein may be implemented by a computing device 610, comprising at least one processing unit 612 and at least one memory 614 which has stored therein computer-executable instructions 616. The server/computer system 110, video data storage subsystem 120, and video data management workstation 130, as well as other components described herein, may each be implemented by and/or comprise a computing device, such as the computing device 610. In implementations where the server 110 is a cloud-based computing infrastructure, the cloud-based computing infrastructure may comprise a plurality of computing devices, such as the computing device 610. The processing unit 612 may comprise one or more processors or any other suitable devices configured to implement the method(s) described herein such that instructions 616, when executed by the computing device 610 or other programmable apparatus, may cause the method(s) described herein to be executed. The processing unit 612 may comprise, for example, any type of general-purpose or specialized microprocessor or microcontroller, a digital signal processing (DSP) processor, a central processing unit (CPU), a graphical processing unit (GPU), an integrated circuit, a field programmable gate array (FPGA), a reconfigurable processor, other suitably programmed or programmable logic circuits, or any combination thereof. The processing unit 612 may be referred to as a "processor" or a "computer processor".

The memory 614 may comprise any suitable machine-readable storage medium. The memory 614 may comprise non-transitory computer readable storage medium, for example, but not limited to, an electronic, magnetic, optical, electromagnetic, infrared, or semiconductor system, apparatus, or device, or any suitable combination of the foregoing. The memory 614 may include a suitable combination of any type of computer memory that is located either internally or externally to the device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 614 may comprise any storage means (e.g., devices) suitable for retrievably storing machine-readable instructions 616 executable by processing unit 912.

The methods and systems described herein may be implemented in a high-level procedural or object-oriented programming or scripting language, or a combination thereof, to communicate with or assist in the operation of a computer system, for example the computing device 610. Alternatively, or in addition, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the methods described herein. Embodiments of the methods and systems described herein may also be considered to be implemented by way of a non-transitory computer-readable storage medium having a computer program stored thereon. The computer program may comprise computer-readable instructions which cause a computer, or in some embodiments the processing unit 612 of the computing device 610, to operate in a specific and predefined manner to perform the methods described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. Those of skill in the art will recognize that many of the methods or algorithms set out herein may employ additional acts, may omit some acts, and/or may execute acts in a different order than specified. The various implementations described above can be combined to provide further implementations.

These and other changes can be made to the implementations in light of the above-detailed description. In general, in the following claims, the terms used should not be construed to limit the claims to the specific implementations disclosed in the specification and the claims but should be construed to include all possible implementations along with the full scope of equivalents to which such claims are entitled. Accordingly, the claims are not limited by the disclosure.

What is claimed is:

1. A method of producing a privacy-protected video clip in a system comprising one or more processors and memory, the method comprising:
   obtaining, using the one or more processors, a plurality of segments of a video clip corresponding to at least a portion of a video stream stored in storage accessible by the system, the plurality of segments being separated by at least a part of a remainder of the video clip and having a total length equal to a defined time period;
   processing the plurality of segments to produce a background model;
   processing the video clip to produce a privacy-protected video clip, wherein, for each image of a plurality of images of the video clip, the processing comprises:
   performing background subtraction, using the background model, to define foreground regions, and
   obscuring the defined foreground regions; and
   outputting the privacy-protected video clip.

2. The method of claim 1, further comprising combining the plurality of segments of the video clip to form a background training clip; and wherein said processing the plurality of segments to produce the background model comprises processing the background training clip to produce the background model.

3. The method of claim 1, wherein said obtaining the plurality of segments of the video clip comprises extracting the plurality of segments from said at least a portion of the video stream stored in the storage.

4. The method of claim 1, further comprising retrieving the video clip into the memory of the system; and wherein said obtaining the plurality of segments of the video clip comprises extracting the plurality of segments from the video clip retrieved into the memory.

5. The method of claim 1, wherein, prior to said obtaining the plurality of segments of the video clip corresponding to said at least a portion of the video stream stored in storage accessible by the system, the method further comprises:

receiving the video stream from one or more cameras of a surveillance system; and storing the video stream in the storage accessible by the system.

6. The method of claim 1, wherein said processing the video clip to produce the privacy-protected video clip comprises obtaining each image of the plurality of images of the video clip from said at least a portion of the video stream stored in the storage.

7. The method of claim 1, wherein the defined time period is greater than or equal to a learning time to produce the background model.

8. The method of claim 1, wherein a segment length is defined and each of the obtained plurality of segments of the video clip has a length which is approximately equal the defined segment length.

9. The method of claim 1, wherein the obtained plurality of segments of the video clip are approximately equally spaced apart in time in the video clip.

10. The method of claim 1, wherein the obtained plurality of segments of the video clip extend across at least a majority of the video clip.

11. The method of claim 1, further comprising receiving a selection by a user of one or more time periods of the obtained plurality of segments of the video clip.

12. The method of claim 1, wherein, in said processing the plurality of segments to produce the background model, said processing is performed without information from any previously retrieved video clips of the video stream.

13. The method of claim 1, wherein said performing background subtraction on the video clip using the background model to define foreground regions comprises comparing a current image of the video clip to the background model to produce a foreground mask.

14. The method of claim 1, wherein said processing the video clip to produce a privacy-protected video clip comprises pixelizing the defined foreground regions.

15. The method of claim 1, wherein, after said outputting the privacy-protected video clip, the method further comprises deleting the privacy-protected video clip from the memory of the system without storing the privacy-protected video clip in the storage accessible by the system.

16. A system to produce a privacy-protected video clip comprising:

one or more processors; and memory, the memory storing a set of instructions that, as a result of execution by the one or more processors, cause the one or more processors to perform:

obtaining, using the one or more processors, a plurality of segments of a video clip corresponding to at least a portion of a video stream stored in storage accessible by the system, the plurality of segments being separated by at least a part of a remainder of the video clip and having a total length equal to a defined time period;

processing the plurality of segments to produce a background model;

processing the video clip to produce a privacy-protected video clip, wherein, for each image of a plurality of images of the video clip, the processing comprises:

performing background subtraction, using the background model, to define foreground regions, and obscuring the defined foreground regions; and outputting the privacy-protected video clip.

17. A non-transitory computer-readable storage medium having computer-executable instructions stored thereon that, when executed, cause at least one computer processor to perform:

obtaining, using the one or more computer processors, a plurality of segments of a video clip corresponding to at least a portion of a video stream stored in storage accessible by the system, the plurality of segments separated by at least a part of a remainder of the video clip and having a total length equal to a defined time period;

processing the plurality of segments to produce a background model;

processing the video clip to produce a privacy-protected video clip, wherein, for each image of a plurality of images of the video clip, the processing comprises:

performing background subtraction, using the background model, to define foreground regions, and obscuring the defined foreground regions; and outputting the privacy-protected video clip.

18. The system of claim 16, wherein the instructions further cause the one or more processors to perform: combining the plurality of segments of the video clip to form a background training clip; and wherein said processing the plurality of segments to produce the background model comprises processing the background training clip to produce the background model.

19. The system of claim 16, wherein said obtaining the plurality of segments of the video clip comprises extracting the plurality of segments from said at least a portion of the video stream stored in the storage.

20. The system of claim 16, wherein the instructions further cause the one or more processors to perform: retrieving the video clip into the memory of the system; and wherein said obtaining the plurality of segments of the video clip comprises extracting the plurality of segments from the video clip retrieved into the memory.

21. The system of claim 16, wherein said processing the video clip to produce the privacy-protected video clip comprises obtaining each image of the plurality of images of the video clip from said at least a portion of the video stream stored in the storage.

22. The system of claim 16, wherein the defined time period is greater than or equal to a learning time to produce the background model.

23. The system of claim 16, wherein, in said processing the plurality of segments to produce the background model, said processing is performed without information from any previously retrieved video clips of the video stream.

24. The system of claim 16, wherein, after said outputting the privacy-protected video clip, the method further comprises deleting the privacy-protected video clip from the memory of the system without storing the privacy-protected video clip in the storage accessible by the system.

* * * * *